June 26, 1928.
F. W. GOLDSTEIN ET AL
1,674,777
SPEED AIR BRAKE CYLINDER HEAD
Filed April 3, 1926
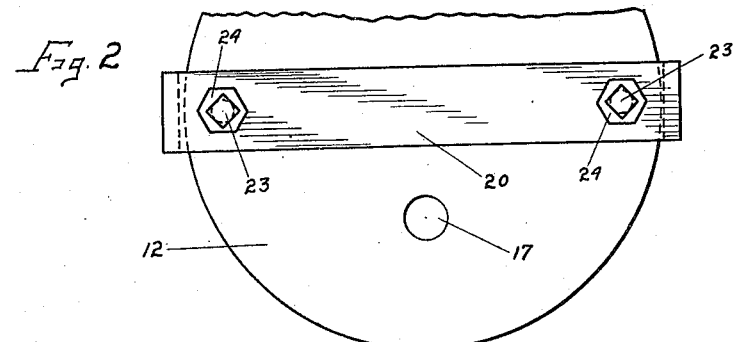
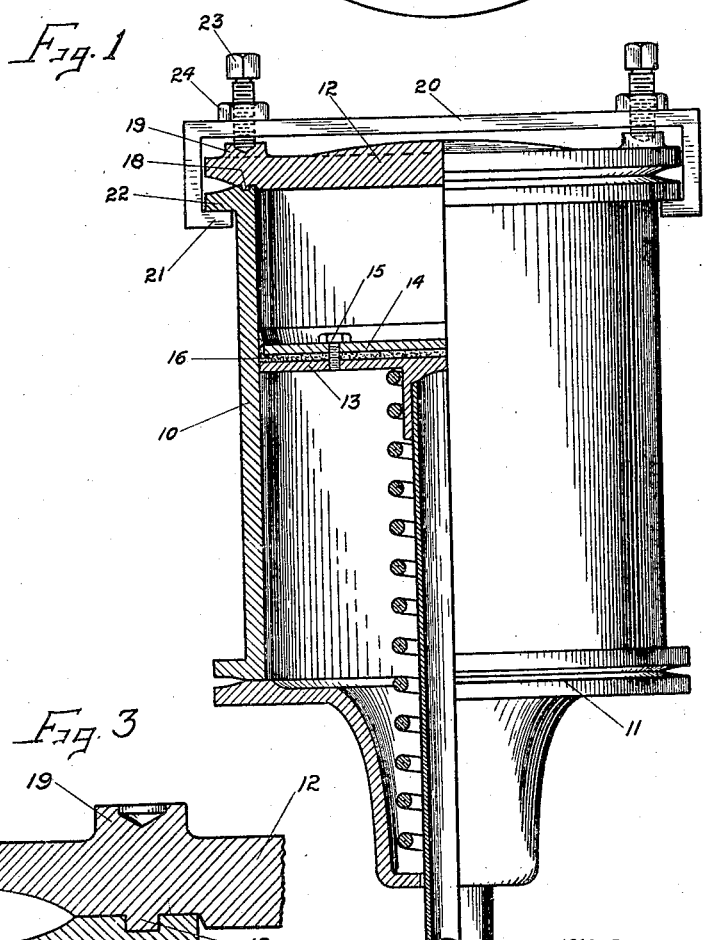
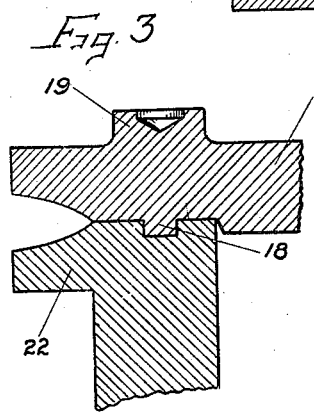
F. W. GOLDSTEIN
R. M. DEAHL.
INVENTORS
BY Emil F. Lange
ATTORNEY.

Patented June 26, 1928.

1,674,777

UNITED STATES PATENT OFFICE.

FRED W. GOLDSTEIN AND ROY M. DEAHL, OF FAIRBURY, NEBRASKA.

SPEED AIR-BRAKE-CYLINDER HEAD.

Application filed April 3, 1926. Serial No. 99,553.

Our invention relates to air brake cylinders and more particularly to the joint on the live end of the air brake cylinder head. It has for its object the provision of an improved joint which may be quickly and easily closed without the use of special tools, the joint being one of the utmost simplicity and effectiveness.

Having in view these objects and others which will be mentioned in the following description, we will now refer to the drawings, in which Figure 1 is a view partly in longitudinal section and partly in elevation of the brake cylinder and the various parts thereof, and showing also our improved joint construction.

Figure 2 is an end elevation of the brake cylinder showing our clamp in its relation to the head of the cylinder.

Figure 3 is a fragmentary view in section of a portion of the cylinder wall and cylinder head and showing in detail the preferred form of our joint.

The cylinder includes the usual cylinder wall 10, the head 11 and the improved head 12. The piston has two discs 13 and 14 which are clamped together by means of bolts 15 with a leather 16 clamped between the discs. The opening for the air pipe is shown at 17.

Our improvements relate solely to the head 12 and to its relation to the cylinder walls 10. This head is constructed with a flat interior surface and with a convex exterior surface as shown at the left in Figure 1. Adjacent its periphery and on its under side there is a circular ridge 18 as shown in Figures 1 and 3, the ridge being formed by cutting concentric grooves on the interior side of the head, one of the grooves being peripheral. The cylinder wall 10 is modified only by cutting a groove in its end wall for snugly receiving the ridge 18 of the head 12. The head 12 is further provided with bosses 19 having sockets in their outer surfaces. For locking the head to the cylinder in such a way as to stand the enormous pressures, we provide a clamp member 20 which passes diametrically over the head. The clamp member has its ends inturned at 21 for engaging with the projecting flange 22 of the cylinder 10. The clamp 20 is provided with screw threaded apertures for receiving the set screws 23, the ends of these set screws fitting into the sockets of the bosses 19. For preventing the accidental loosening of the set screws, each set screw is provided with a suitable lock nut 24 of any desired form.

The present air brake cylinders are provided with a special form of gasket which is quite expensive because of its form and construction. The gasket moreover is not entirely satisfactory in use since it frequently permits the air to escape through the joint. These special gaskets are short-lived, thus entailing a very heavy expense for replacement of the gaskets as they become worn out. The most serious objection to the present form of joint is that the insertion of these gaskets is a rather complicated matter requiring considerable time. When the failure of the gasket occurs on the road the train must be stopped and the entire train crew is kept idle for a considerable period of time while the joint is being repaired. With our joint, however, the head may be removed and replaced within a few minutes' time and with the use of a wrench only, there being only two set screws 23, each with a simple bolt head. The loosening of these set screws immediately releases the clamping bar 20 and permits the head 12 to be removed from the cylinder. If the trouble is then found to be in the head, a new head may be clamped against the cylinder. If the trouble is due to foreign matter in the joint, this matter may be easily removed and the head replaced. If a flaw is found in the surface of either the head or the cylinder at the joint, the flaw may be remedied by the use of white lead or shellac or any other suitable material which happens to be convenient. If it is desired to use a gasket in our improved joint, a simple annular gasket of any suitable material will serve the purpose. The gasket may be made of paper, leather, sheet rubber or other suitable gasket material. In fact, a gasket may be improvised from a newspaper. The gasket will be compressed in the joint when the set screws 23 are tightened, and the compression of the gasket will cause it to fill any tiny depressions in the surface at the joint. The gasket may be made still more effective by the use of shellac or other substances frequently used for such purposes.

It should be noted that the pressures inside the cylinder are very great, being about seventy pounds for freight service and about one hundred pounds for passenger cars.

Any slight defect in either the cylinder or the head at the joint will thus release the pressure in the cylinder and will prevent the functioning of the brake. The cylinders and heads are usually formed from cast iron which is very apt to develop defects in use, which defects escape notice in the original tests. Our improved joint is so constructed that even though the defects in the cast iron at the joint may be considerable, they may be easily cured by the use of material which is always readily available and with almost no loss of time.

From the foregoing description in connection with our drawings, it will be seen that our joint is of extreme simplicity especially as regards removal and replacement of the cylinder head. It is also of the utmost effectiveness. The cylinder and the head each has a circular ridge seated snugly in a corresponding circular groove in the other member. Leakage of air is virtually impossible. The height and width of the ridges such that intimate contact is made on three sides of the ridge, except in the case of the inner ridge of the cylinder. The groove for seating that ridge is wider at its open end than at its base to facilitate seating the ridges in the grooves. The inclined inner wall of the groove in the head is also of importance when using a gasket between the head and the cylinder.

Having thus described our invention in such full, clear, and exact terms that its construction and operation will be readily understood by others skilled in the art to which it pertains, what we claim as new and desire to secure by Letters Patent of the United States is:

A cylinder and closure head therefor, the cylinder and head having inter-engaging parts and said cylinder having peripheral projections extending radially outward therefrom, a rigid strap extending diametrically over said head and engaging said peripheral projections, a plurality of set screws in said strap arranged in line with the inter-engaging parts of the cylinder and closure head, and bosses on the exterior surface of said head and positioned immediately above said inter-engaging parts, said bosses being provided with sockets for receiving the ends of said set screws.

In testimony whereof we affix our signatures.

FRED W. GOLDSTEIN.
ROY M. DEAHL.